Sept. 24, 1957     P. W. ZILLIACUS ET AL     2,807,083
FASTENING METHOD
Filed Jan. 31, 1955                                                           2 Sheets—Sheet 1
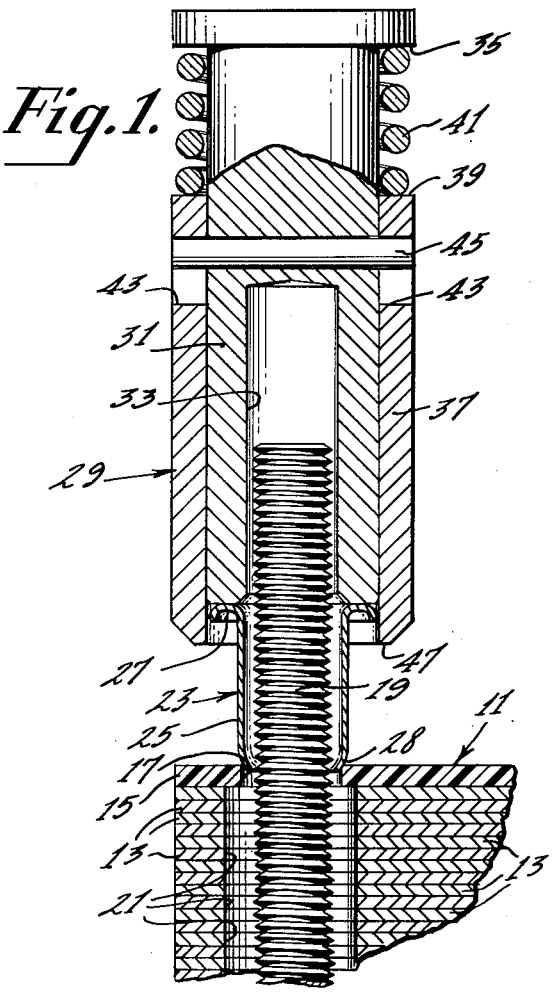
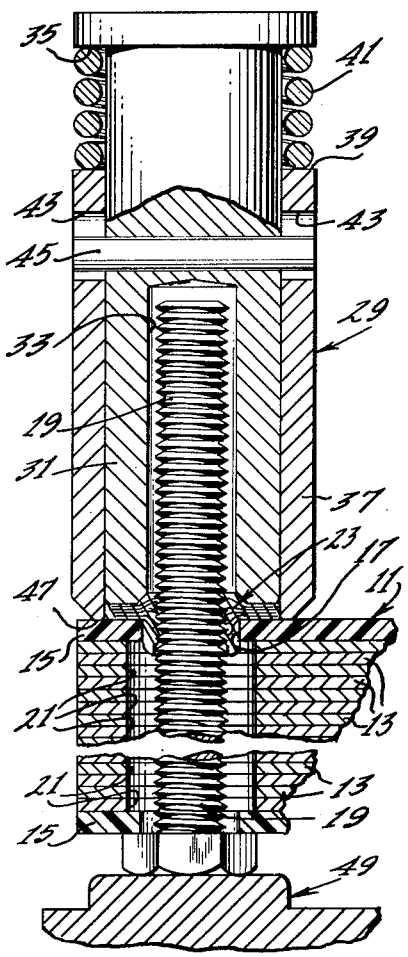
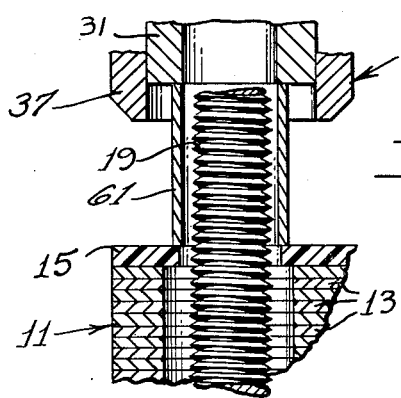
INVENTORS
Patrick W. Zilliacus
& Max Gersenson
BY
ATTORNEY Sept. 24, 1957 P. W. ZILLIACUS ET AL 2,807,083
FASTENING METHOD Filed Jan. 31, 1955 2 Sheets-Sheet 2

INVENTOR.
Patrick W. Zilliacus
& Max Gerzenson
BY
ATTORNEY.

2,807,083
Patented Sept. 24, 1957

2,807,083
FASTENING METHOD

Patrick W. Zilliacus, Collingswood, N. J., and Max Gersenson, Philadelphia, Pa., assignors to Radio Corporation of America, a corporation of Delaware Application January 31, 1955, Serial No. 484,968

2 Claims. (Cl. 29—510)

This invention relates to an improved method of fastening, and more particularly to an improved fastening method involving the use of threaded bolts or studs.

In the manufacture of small industrial products, the product assembly frequently comprises a pair of opposing cover plates or enclosing members which are secured together by means of nuts and bolts or by means of nuts and studs which are attached to one of the cover plates and extend through apertures in the opposing cover plate. In employing either of these means, it is necessary to fasten the nuts to each of the bolts or studs and to spin each of these nuts individually on its respective bolt or stud to a point where the nut holds the assembly tightly together.

An object of this invention is to provide an improved method for fastening together small assemblies.

Another object of this invention is to provide an improved fastening method which employs threaded studs or bolts.

A further object of this invention is to provide an improved method of fastening an assembly wherein the securing means comprises a plurality of threaded studs or bolts disposed parallel to each other.

A still further object of this invention is to provide an improved method for fastening an assembly including a plurality of studs or bolts wherein the fastening means may be secured to all of the studs or bolts simultaneously.

A still further object of this invention is to provide an improved method of fastening an assembly including threaded studs or bolts wherein the necessity of spinning nuts on the threaded members is eliminated.

A still further object of this invention involves an improved method of fastening an assembly including threaded studs or bolts wherein a fastening means can be accomplished by automatic methods.

In accordance with the present invention, an improved fastening method involves the use of a tubular member which fits relatively snugly over the threaded portion of a threaded member. The threaded member may be in the form of a bolt or screw which extends through aperture provided in two or more portions of an assembly which is to be fastened together, or it may be in the form of a stud which is rigidly attached to one of the portions of the assembly and extends through apertures provided in the remaining portions of the assembly which is to be fastened together. In a preferred form, a plurality of threaded members extend parallel to each other in one direction and have threaded free ends extending out of the assembly on one side thereof. A tubular member is placed over each of the threaded free ends. These tubular members are compressed against one side of the assembly while the opposite side of the assembly, including the heads of the bolts or screws if applicable, is held against movement. This compressing force causes the tubular members to collapse or accordion against the assembly and to engage several threads of each of the threaded members whereby the assembly is locked together.

The novel features of the invention, as well as additional objects and advantages thereof, will be understood more fully from the following description when read in connection with the accompanying drawing, in which:

Figure 1 is a fragmentary sectional view of a tool in position to press an eyelet to fasten a transformer structure;

Figure 2 is a view similar to Figure 1 wherein the eyelet has been compressed to form the equivalent of a nut; and Figure 3 is a view similar to Figure 1 wherein a simple tube provides the fastening member.

Figure 1A:
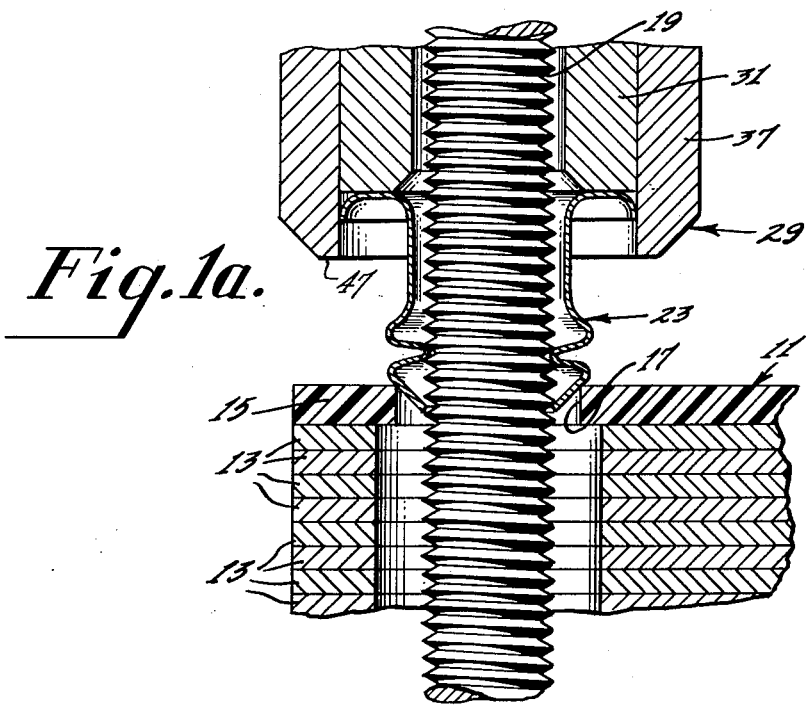
Figure 1a is a fragmentary sectional view illustrating the eyelet as it begins to collapse and accordion due to the pressure of the tool.

Referring in more detail to Figures 1 through 2 of the accompanying drawing, the present invention is exemplified in the assembling of a transformer and the fastening together of the assembly means of bolts and eyelets. A transformer assembly 11, illustrated in section, comprises a plurality of laminations 13, stacked adjacent each other and enclosed at either end by an end plate or an end shield 15. The ends plates 15 are a part of the transformer assembly and are made of any suitable material which is harder than the material of the eyelets and which may be formed to provide a suitable casing for the transformer. The end plates 15 are provided with apertures 17 dimensioned to receive bolts 19 and providing a small clearance between the apertures and the bolts. Apertures 21, provided in the laminations 13 to accommodate the bolts 19, are somewhat larger than the apertures 17 since the clearance between these apertures and bolts is not critical.

A standard eyelet 23 of a pliable metal, such as brass, is placed over the end of each bolt 19 and engages the outer surface of the end plate 15. This eyelet comprises a relatively long, thin-walled, substantially cylindrical portion 25 and a head portion 27 formed by a flaring outwardly of one end of the cylindrical portion 25. The end of the eyelet opposite from the head portion 27 is tapered inwardly to provide a portion 28 of reduced external diameter. It is this feature of the standard eyelet which makes it especially suitable for use in practicing the method of the present invention. It is desirable to maintain a substantial portion of the eyelet outside of the aperture 17 since this provides a larger amount of metal for engagement with the bolt 19. It is also desirable that a portion of the eyelet extend into the aperture 17. The aperture 17 then is dimensioned to receive the reduced portion 28 of the eyelet. This aids in causing the eyelet material to accordion while it is being compressed against the upper end plate 15 to form the fastener.

A forming tool 29 for compressing an eyelet 23 against the upper end plate 15 comprises a driving bar 31 which may be constructed of a hardened steel bar having an outer diameter slightly larger than the maximum diameter of the eyelet head 27. This bar is provided with a cylindrical recess 33 extending axially from its lower end and being sufficiently deep to accommodate the ends of the bolts or studs against which it compresses the eyelet. An annular shoulder 35 is provided at a point removed from the end of the bar. A cylindrical sleeve 37 is slidably mounted over the lower end of the bar 31. The upper surface 39 of this sleeve opposes the shoulder 35 of the bar 31 and a helical compression spring 41 is mounted on the bar, bearing against the shoulder 35 and the surface 39. A pair of elongated slots 43 are disposed longitudinally in opposite sides of the sleeve 37 adjacent the upper end of the sleeve. A pin 45 extends diametrically through the bar 31 and is rigidly fixed to the bar.

The ends of this pin 45 extend out of the bar 31 and through the slots 43. By this means the sleeve 37 is supported on the bar 31. The spring 41 will bias the sleeve 37 downwardly with respect to the driving bar 31 and in this downward position the lower surface 47 of the sleeve 37 will extend somewhat below the end of the driving bar 31. The action of the driving bar 31 is opposed by an anvil or plate 49 which engages the heads of the bolts 19.

Figure 1B:
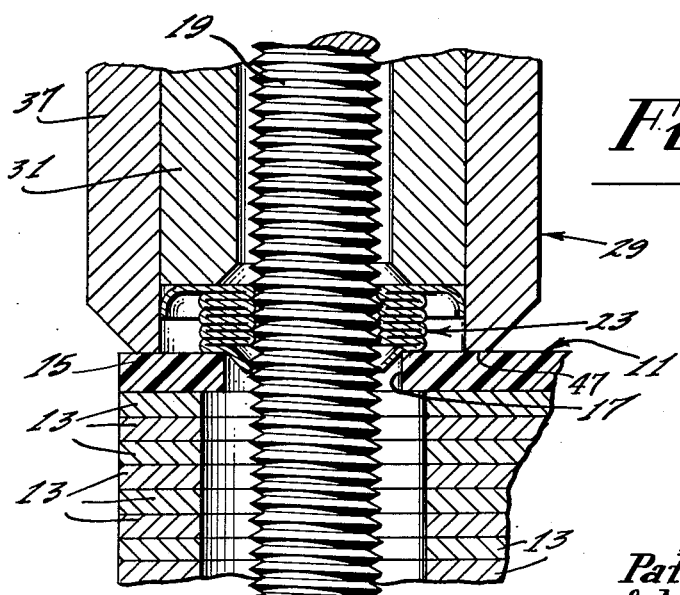
Figure 1b is a fragmentary sectional view illustrating the eyelet completely collapsed and accordioned just prior to final compression by the tool.

Referring now to Figures 1a, 1b and 2, it will be seen that when the bar 31 descends to axially compress the eyelet 23 against the transformer end plate 15, the eyelet begins to collapse or accordion from its tapered end portion 28 upwardly. The apparent reason that the collapsing begins at the tapered end portion 28 is that there is already an annular bend in the eyelet, at the upper end of the tapered end portion 28 as shown in the drawings, and the eyelet is therefore presumably less resistant to deformation at this point. In addition, a component of force is exerted upwardly and inwardly against the tapered portion 28 by the upper edge of the end plate aperture 17. This force acts to further bend or deform the eyelet at this point. As a result of this first bend, the eyelet metal is deflected inwardly against the bolt threads. Once the first fold is formed at this end of the eyelet, the folding progresses from this point since each bend or fold in one direction starts a bend or fold in the oposite direction. It will be understood, however, that the manner in which the accordion folds are formed does not materially effect the final form of the eyelet or the manner in which the eyelet engages the bolt 19. Since the eyelet is composed of a pliable metal, the accordion folds which are formed in the eyelet as it is axially compressed are confined to an area immediately adjacent the bolt 19 over which the eyelet has been placed. As the folds form, the internal surfaces of the folds engage the surface of the bolt 19 due to the small clearance between the internal surface of the eyelet and the bolt. These folds do not extend radially outwardly from the bolt to the extent that they interfere with the descending sleeve 37.

The lower surface 47 of the sleeve 37 engages the end plate 15 before the bar 31 reaches the end of its downward stroke. The sleeve 37 then maintains the collapsed eyelet within its confines. With continued downwardly movement of the bar 31, the eyelet metal is compressed and tends to expand radially outwardly and inwardly. Since radial expansion is now limited by the sleeve 37, the greater expansion is directed inwardly against the bolt 19 so that several threads are securely engaged by the eyelet metal. The metal of the eyelet 23 is formed effectively, though not actually, into a solid metallic mass 23 as shown in Figure 2. As the bar 31 continues to move downwardly, the sleeve 37 moves upwardly relative to the bar 31, this movement being against the force of the spring 41 and being permitted by the elongated slots 43.

The inclusion of the sleeve 37 as a part of the tool 29 is not essential to the practice of the present invention. The simple axially compressive force on the eyelet, which fits closely around the bolt, provides sufficient engagement between the folds of the eyelet metal and the bolt for some applications. However this sleeve provides a practical means for assuring good binding between the eyelet metal and the bolt, especially where a large amount of metal is compressed against the bolt.

Referring now to Figure 3 a fastening method is illustrated employing a plain, thin-walled, metallic sleeve 61 as the element to be compressed against a bolt 19. Since the sleeve 61 is not provided with a tapered portion as described above, the collapse of the sleeve will probably not follow the same pattern. Presumably, the collapse of the sleeve will start at about the center of the sleeve since the stress would be greatest at this point. The folding of the sleeve will then progress in either direction from this central point. When such a sleeve is compressed the formed fastener is substantially similar to the fastener illustrated in Figure 2.

The method is again illustrated in the assembling of a transformer 11 comprising a plurality of laminations 13 and an end shield 15. The forming tool 29 is identical to that described theretofore and comprises a driving bar 31 and a retaining sleeve 37 axially movable relative to the driving bar.

In Figures 1 and 3 of the accompanying drawing, both the eyelet 23 and the sleeve 61 have been shown initially as resting largely on top of the transformer end plate; that is only a small portion, if any, of the tubular parts of these members extends into the aperture provided in the transformer end plate and through which the bolt extends. With this arrangement essentially all of the metal of the fastener element is available to be compressed against the threads of the bolt and therefore more of the threads will be engaged by this metal to form a stronger fastener. Where fastener strength is not a prime consideration of the assembly, that is where high strength is not required, the aperture in the end transformer plate could be made larger in relation to the dimensions of the bolt in order to permit a substantial portion of the eyelet or other headed member to extend into the aperture. With this latter arrangement only the portion of the fastener comprising the head would be compressed against the threaded portion of the bolt and therefore fewer threads would be engaged. This arrangement provides the advantage, however, that the size of the aperture in the end plate is much less critical thereby reducing fabrication costs for the overall transformer assembly.

A brass eyelet applied in the manner illustrated in Figures 1 and 2 requires a force of 375 pounds to strip the eyelet from the bolt. An eyelet applied in the manner described immediately above, wherein only the head is collapsed against the bolt, requires a force of as much as 150 pounds to strip the eyelet from the bolt. It will be apparent from the foregoing that a standard brass eyelet used in the Figures 1 and 2 and of the accompanying drawing in the manner disclosed herein provides a fastener that is as effective as a steel nut from the standpoint of strength. The outstanding advantage of the use of eyelet type fasteners as disclosed over the use of nuts is that the eyelets can be pressed on in multiples rather than being spun on individually. In the case of large run production items, this can result in a considerable saving of time and labor. Another advantage of a fastener applied in accordance with the present invention is that this fastener will have far less tendency to shake loose than would a nut due to the intimate almost weld-like quality of the engagement between the fastener and the bolt threads.

What is claimed is:

1. A method of securing a structural part by a securing device comprising a thread member for insertion through an opening in said structural part and a metallic sleeve to be engaged with said threaded member, said method comprising inserting said threaded member through said structural part whereby a portion of said threaded member projects from said part, positioning a relatively long, thin-wall, pliable, metallic sleeve over said threaded member projecting from said opening in said structural part and in engagement with said structural part at said opening, said sleeve having an inwardly tapered end portion dimensioned to be partially received within said opening, said sleeve having an internal diameter slightly larger than the external diameter of said threaded member, restraining said threaded member from movement out of said opening in said structural part, and compressing said sleeve against said structural part with a simple axial force, said axial force effecting the collapse of said sleeve into folds progressing from the tapered end thereof and forcing the internal folds of said sleeve into locking engagement with said threaded member.

2. A method of securing a structural part by a securing device comprising a threaded member for insertion through an opening in said structural part and a metallic sleeve to be engaged with said threaded member, said method comprising inserting said threaded member through said structural part whereby a portion of said threaded member projects from said part, positioning a relatively long, thin-walled, pliable, metallic sleeve over said threaded member projecting from said opening in said structural part and in engagement with said structural part at said opening, said sleeve having an inwardly tapered end portion dimensioned to be partially received within said opening, said sleeve having an internal diameter slightly larger than the external diameter of said threaded member, restraining said threaded member from movement out of said opening in said structural part, compressing said sleeve against said structural part with a simple axial force, said axial force effecting the collapse of said sleeve into folds progressing from the tapered end thereof and forcing the internal folds of said sleeve into locking engagement with said threaded member, and additionally compressing said collapsed and folded sleeve while limiting outward radial expansion of said sleeve whereby said sleeve is expanded inwardly to provide more intimate engagement of said sleeve with said threaded member.

References Cited in the file of this patent

UNITED STATES PATENTS

| | | |
|---|---|---|
| 1,447,520 | Schade | Mar. 6, 1923 |
| 1,639,511 | Lefever | Apr. 16, 1927 |
| 1,852,297 | Gelpcke | Apr. 5, 1932 |
| 1,905,730 | McIntosh et al. | Apr. 25, 1933 |
| 2,465,654 | Millard | Mar. 29, 1949 |
| 2,535,403 | Froggatt | Dec. 26, 1950 |
| 2,542,376 | Torresen | Feb. 20, 1951 |
| 2,639,832 | Bergstrom | May 26, 1953 |